United States Patent [19]

Sugimoto

[11] 4,030,453
[45] June 21, 1977

[54] METHOD OF WATER ADMIXING TO FUEL OIL FOR AN INTERNAL COMBUSTION ENGINE AND APPARATUS THEREFOR

[76] Inventor: Takeshige Sugimoto, 537, Higashikawa, Tosayama, Tosa, Kochi, Japan

[22] Filed: Oct. 31, 1975

[21] Appl. No.: 627,882

[30] Foreign Application Priority Data

July 16, 1975 Japan .............................. 50-86206

[52] U.S. Cl. .................................. 123/3; 123/1 A; 123/25 B; 123/122 C; 123/25 P
[51] Int. Cl.² .................. F02B 43/08; F02D 19/00; F02M 31/00
[58] Field of Search ......... 123/1 A, 3, 119 E, 25 R, 123/25 B, 25 D, 25 P, DIG. 12, 122 C, 122 D, 122 E, 22

[56] References Cited

UNITED STATES PATENTS

| | | | |
|---|---|---|---|
| 1,267,924 | 5/1918 | Smith | 123/25 B X |
| 1,295,916 | 3/1919 | Mayers | 123/25 B X |
| 1,343,858 | 6/1920 | Wein | 123/25 B |
| 1,357,039 | 10/1920 | Duntley | 123/25 B |
| 1,509,426 | 9/1924 | Gregg | 123/25 B |
| 1,527,844 | 2/1925 | Dahlgreen et al. | 123/25 B |
| 2,036,834 | 4/1936 | Schmitt | 123/25 B X |
| 3,682,142 | 8/1972 | Newkirk | 123/3 |
| 3,717,129 | 2/1973 | Fox | 123/3 X |

Primary Examiner—C. J. Husar
Assistant Examiner—Ira S. Lazarus
Attorney, Agent, or Firm—Wenderoth, Lind & Ponack

[57] ABSTRACT

The present invention is directed to a method of and an apparatus for producing mixture gases of three elements such as water vapor, fuel oil and air to be combusted in the combustion chamber of an internal combustion engine. The mixture elements, particularly water vapor, are heated so that they may be mixed in vapor phase while passing through passageways provided to absorb a heat generated in the combustion stroke of the engine. Under controlled combustion conditions, the mixture of these three elements may be fully combusted in the combustion chamber of the engine, whereby a large quantity of water may be applied to a fuel mixture as a substantial part thereof, thus resulting in a remarkable improvement in the fuel consumption or the output per unit of fuel oil in the internal combustion engine.

12 Claims, 8 Drawing Figures 4,030,453

METHOD OF WATER ADMIXING TO FUEL OIL FOR AN INTERNAL COMBUSTION ENGINE AND APPARATUS THEREFOR

BACKGROUND OF THE INVENTION

The present invention relates in general to an improvement of fuel consumption of an internal combustion engine, and particularly to a method of and apparatus for improving fuel consumption of an internal combustion engine by way of applying water as a substantial part of fuel to be fed thereto.

There have been proposed a variety of approaches for adapting water in the consumption of fuel oil in an internal combustion engine in use for an automobile and the like. The majority of such approaches are related to a so-called water-addition method for the purpose of promoting fuel combustion in the combustion chamber of an internal combustion engine, thus intending to reduce the generation of noxious substances in the exhaust gases from an engine. An appropriate quantity of water mixed with such admixtures as methanol or hydrates is fed in an atomized state into a combustion chamber of an engine together with fuel-air mixture so that they may be combusted in the combustion chamber thereof. However, such a water-addition method, no matter how it may be adapted, has not been successful in an improvement of a fuel mixing rate or, in other words, in a substantial curtailment of fuel consumption. If a rate of cold water to be admixed to the fuel mixture is increased once, it is known that proper operation or combustion in the combustion chamber of an engine is considerably impaired.

In addition, it is inevitable that if cold water is admixed to the fuel mixture in the combustion chamber of an engine, there is observed such disadvantages as wear or abrasions in the interior of the combustion chamber of an engine. It is considered that such disadvantageous wear of the combustion chamber is attributable to the fact that an extra-high energy of combustion is needed and occurs in the combustion chamber to get cold-water content in a mist or fine particle state in the mixture fully decomposed during a combustion stroke of an engine which is actually only a short period of time. In the case where pure hydrogen is applied in the combustion chamber of an engine, it is apprehended that there would occasionally occur an explosion of hydrogen in the exterior of an engine, which requires, therefore, extra means of caution against such a risk. In addition, such pure hydrogen would be a major part in the operation and maintenance cost of an internal combustion engine.

In consideration of the disadvantages which have been inherent to the conventional water mixing processes and which are still uncorrected, it would be advantageous if an improved method of admixing water to a fuel mixture for an internal combustion engine, and an improved apparatus therefor, may be made available or practicable.

The present invention is essentially intended for overcoming all such disadvantages of the prior art.

SUMMARY OF THE INVENTION

According to this invention, there is provided an improved and useful method of an apparatus for admixing water to the fuel mixture, wherein three elements, i.e., two kinds of liquid or water and fuel oil, plus air are mixed and processed to a required fuel-air mixture gases of a high temperature by using a heat generated in the internal combustion engine per se. Thus obtained mixture gases may be fully processed so as to meet the combustion conditions in the combustion chamber of an internal combustion engine, thereafter subjected to combustion therein.

According to the present invention, it is now made practicable to utilize a relatively large quantity of water as a substantial part to the absolute quantity of fuel. It is therefore a primary object of this invention to provide an improved and useful method of and apparatus for admixing water of substantial quantity to fuel mixture for an internal combustion engine so that it may contribute to general reduction of fuel consumption, thus eventually reducing consumption of petroleum resources.

By use of the present invention, it is now practicably possible that only about a half quantity of fuel be consumed in an automobile covering a milage twice as long as that of the conventional method. When adapting water as a substantial part of fuel mixture components in an automobile equipped with a gasoline engine under optimal operating conditions (in terms of actual water admixing rate), it is possible to make the fuel mixture fully combusted with a mixing ratio of: gasoline 100 to water 70. Therefor it should be noted how much a reduction of fuel consumption is in comparison with the conventional gasoline-only combustion engines, and thus how much a contribution will now be made to reduction of fuel cost.

It is another object of this invention to reduce the production of CO content in exhaust gases from an engine by using a fuel mixture admixed with a substantial quantity of water. According to the improved method of fuel combustion of this invention, it is possible to remarkably reduce the CO content to such an extent that the exhaust gases may be completely invisible, and so it is observed that the engine is in a state of a complete combustion. Such a combustion effect is promoted as the internal combustion engine becomes overheated, and as this condition continues the more quantity of water consumed, the more output power from the engine.

It is still another object of this invention to totally utilize a waste heat generated in the high temperature portions of an engine. This may be achieved by virtue of a specific feature of the present invention such that water, fuel oil and air are all mixed in a vapor phase or a heated state by using the waste heat generated in the internal combustion engine. Particularly, water is stepwise accelerated in heating by the waste heat of the engine, once in a vapor phase and finally in a state of gasification, or of water gases or nearly water gases, produced by immediate contact with the high temperature metal parts such as cylinder head of the engine so as to be partly or almost completely cracked, which is thereafter directed to the combustion chamber of the engine.

This invention is also intended for the provision of an improved heating apparatus of complex type which is essentially designed for heating stepwise water to be applied to the method of this invention.

The essential feature of the present invention lies therefore in the following point of design. When pure hydrogen is derived for use from water, and when thus obtained pure hydrogen is mixed in an air volume, it quite often bypasses that pure hydrogen explodes. However, the method of this invention is, as stated herein-before, characterized in that water is directed into the combustion chamber in a state of gas heated at a high temperature such that it is not yet fully decomposed to pure hydrogen plus other. In other words, it is either in a critical state of being almost cracked where water molecules are mostly reducing their chemical combination, or in a state of being partly cracked, and thereafter subjected to higher temperatures in the combustion chamber so that it may be fully exploded and thus combusted. As is generally acknowledged, water is a substance of quite a stable compound, however, it begins to be decomposed when it is heated to a certain known high temperature level. It is also known that the cylinder head portions of an internal combustion engine are occasionally caused to be heated at a temperature level of 2,000° C due to the combustion heat produced therein. Therefore, it is practicably possible to get the water vapor contacted with the cylinder head portions of the engine so that it may be caused to be in the critical state as stated hereinbefore.

It is another feature of this invention that heated gases of three elements, i.e., water, fuel oil and air are not mixed in the combustion chamber of the engine, but mixed prior to a suction or ejection into the combustion chamber thereof, and thereafter supplied into the combustion chamber in a state of completely mixed gases free from any uneven mixing. Oxygen content, decomposed from water vapor at a gaseous phase heated at an extra high temperature as stated above, is inclined to depart from hydrogen content, and there is observed a tendency for the oxygen content and the molecules of fuel oil heated to vapor phase to combine with each other. Thus individual molecules are caused to be exploded and combusted in successive reaction, resulting in a satisfactory or complete combustion.

It is still another feature of this invention to provide a heating mechanism wherein, as means for obtaining a gasification state of water vapor, there is provided a passage directly communicating within the cylinder head of an engine for passing water vapor or water vapor heated gases therethrough. The water vapor and/or water gases is caused to contact with the high temperature metal walls on their way of passing, thereby being immediately gasified and thereafter being supplied into the combustion chamber.

It is still another feature of this invention to introduce water vapor into the combustion chamber through a water vapor filtration means wherein gases to be admitted in the above mentioned high temperature heating stage are heated ones and are filtered so as to be free from any water particles of relatively large sizes. This filter means for filtering the water vapor is composed of such material as iron which is reactive with oxygen, with use of such material exhibiting a certain catalytic reaction, whereby the oxygen content in the water vapor may partly be removed by reaction with the iron content in the filter means as the oxygen content passes therethrough. On the other hand, this filter is also characterized in that it comprises a net-like or porous material of gas and water permeability, thus effectively removing water particles in the water vapor through the fine meshes thereof.

It is a still further feature of this invention to provide improved means for heating and filtering water vapor.

It is a still further feature of this invention to provide improved water supplying means for preventing water from being frozen or getting colder in an application in a cold northern district, wherein water is stored in the inside of a fuel tank, and water is supplied through and inside of a fuel supply pipe to the water vapor generator.

The foregoing objects, features, principle, and details of the present invention, as well as further objects and features thereof, will become apparent from the following detailed description with respect to preferred embodiments of the invention when read in conjunction with the accompanying drawings. It is to be understood, however, that although the detailed description will be made with only reference to particular embodiments of the invention, such embodiments may readily be changed or modified by those skilled in the art, to which this invention is related.

In the accompanied drawings, like parts are designated with like reference numerals.

DETAILED DESCRIPTION OF THE INVENTION

Figure 1:
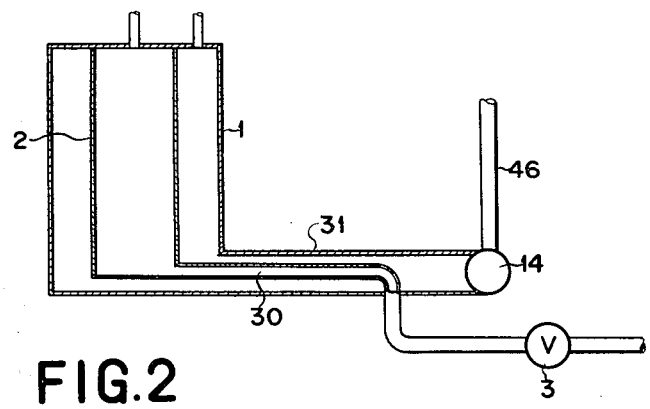
FIG. 1 is a schematic diagram of a general arrangement of the water and fuel tank means with connections for supply thereof according to this invention, showing the double construction supply mechanism thereof.
Figure 2:
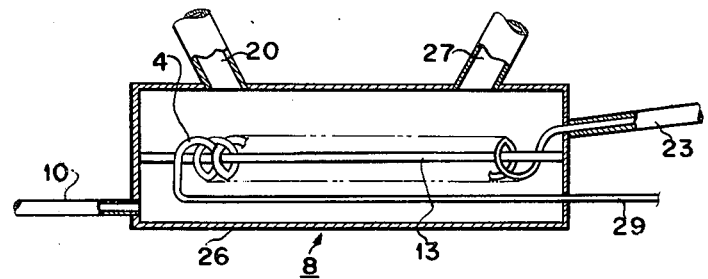
FIG. 2 is a cross-sectional view showing the construction of a first heater according to this invention.
Figure 3:
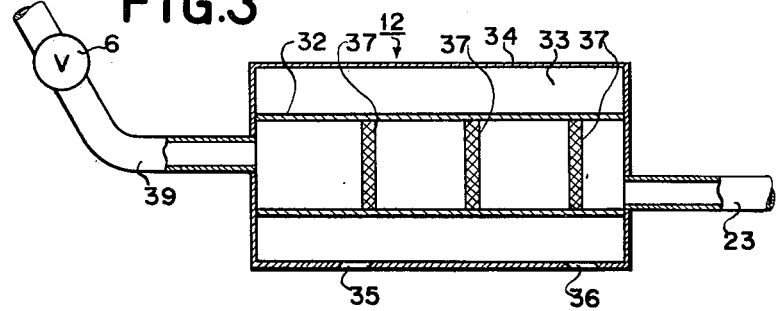
FIG. 3 is a general view, partly in section, of a water vapor heater and filter of the invention.
Figure 4:
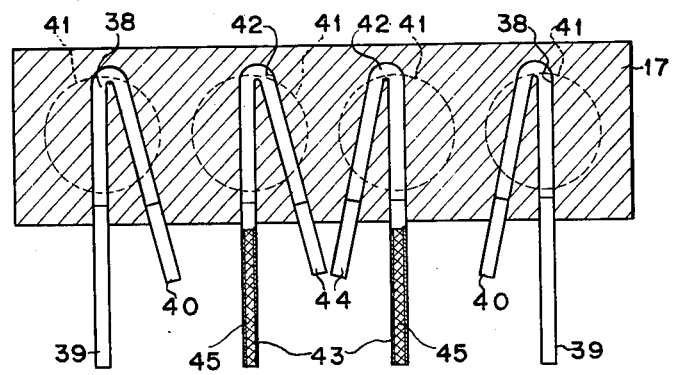
FIG. 4 is a schematic cross-sectional view showing the arrangement of a water vapor heater to be applied to the cylinder head portions of an engine.

The construction and operation of an improved water admixing arrangement according to the present invention will now be described in detail with respect to preferred embodiments thereof in conjunction with the accompanying drawings. It should be understood, however, that the embodiments appeared herein are for illustrative purpose only and do not in any way limit of the scope of the invention.

As described hereinbefore, according to the present invention, there is provided an improved and useful method of and apparatus for admixing a fuel oil with a substantial quantity of water, which is practiced by causing water vapor, fuel oil and air to be heated separately at predetermined high temperatures, respectively. The high temperature generated in the fuel combustion of an internal combustion engine is utilized and the mixture elements are mixed prior to being supplied into the combustion chamber under optimal combustible conditions. The mixed gases are then fed to the combustion chamber, thus being combusted therein so as to obtain a desired reduction of fuel consumption.

In order to attain the required mixing and combustion conditions, first water is heated in a first heater 8 to a temperature of 100° C or higher, thus obtaining a water vapor. Secondly, the thus obtained water vapor is further heated in a second heater 12, thus producing a clear gas or water gases. This superheated water vapor or gases may then be directed to the high temperature portions of the cylinder head 17 of the engine, while the flow is controlled by use of a regulating valve 6, which is operatively interconnected to the acceleretor pedal of the engine. The water vapor heated gases may then occasionally be caused to contact with such cylinder head portion having a temperature of 2,000° C or so.

Through immediate contact of the gases with metal wall portions of extra-high temperatures, the water vapor heated gases are caused to change in their molecular bonding phase. The gases are thus expanded to a state where the gases are almost cracked or they are partly cracked. The water vapor heated gases in such critical state may be described as being in the state of water gasification.

On the other hand, the fuel oil is likewise vaporized by passing through a heater 9, and air is also heated by passing through the cylinder head 17 of the engine. Thus obtained high temperature air is then directed with the heat-vaporized fuel oil through carburetor 19 so as to be mixed in the conventional manner, thereafter joining into the flow of water vapor heated gases in an intake tube 18 communicating with the combustion chamber of the engine. Mixed gases of three elements are thus obtained and fed into the combustion chamber. In this manner, such combustible elements as water, fuel oil, and air may be caused to be fully combusted under optimal combustion controls.

It should be noted that by virtue of admixing water vapor heated gases to the fuel oil, the octane number of the fuel is improved, and consequently, there is an increase of the ignition point of the mixture gases. Thus, safety measures are insured even if all the components of such apparatus are kept in a high temperature range.

The above mentioned first heater 8 comprises a hollow structure 26 made of metal, and there are provided an inlet 20 communicating with an exhaust tube 16 for exhaust gases 28, and an outlet 27 in the hollow structure 26 so that exhaust gases 28 may freely pass therethrough. In addition, there are provided a heat accumulator rod 13 in the center of the hollow structure 26 along with the longitudinal axis thereof, a water supplying tube 29 inserted in the longitudinal direction of the structure 26 at one end thereof, and coiled in closely circumferentially tracing relationship with the rod 13 at the other end so as to form a coiled tube 4 therearound. The coiled tube 4 may be made of a material of a high thermal conductivity such as copper for the purpose of introducing water therethrough. Exhaust gases may there pass around and through the coiled cube 4, whereby water may be heated so as to be converted to water vapor. As the coiled tube 4 is arranged to spirally trace in circumferential relationship with the central accumulator rod 13, it is characteristic that such heat conveyed in the exhaust gases from the exhaust tube 16 may be effectively absorbed. The above mentioned water supply tube 29 is arranged to communicate to a water tank 2 so that the first heater 8 is always fed with an appropriate quantity of water, and further provided with a check valve 3 therealong so that water may be prevented from flowing in a reverse direction under a water vapor pressure. A water tank 2 and the supply tube 30 therefrom are arranged in double construction relationship with the fuel tank 1 and the feed tube 31 thereof, respectively, so that water is always stored in the tank 2 and fed therefrom under a heat insulation condition by the fuel oil staying therearound. This prevents water from being frozen or getting colder by use of the apparatus in a northern cold district.

The water vapor produced in the first heater 8 is fed through the tube 23 communicating with the terminal end of the coiled tube 4 to the second heater 12 so as to be further heated thereby. The second heater 12 is provided with a passage 32 for water vapor introduced by a tube 23, and further provided with a chamber 33 as defined by an outer circumferential wall 34 in the outer circumference of the passage 32, wherein the chamber 33 and the exhaust tube 16 are communicating with each other by means of an exhaust inlet 35 and outlet 36. Exhaust gases are introduced through the inlet 35 into the chamber 33 so that the chamber is always filled up, thus constantly contacting with the other circumference of the water vapor passageway 32. Consequently, water vapor is, when passing through the passageway 32, heated further to a still higher temperature. There are provided a plurality of filter elements 37, which are composed of porous material, in the center of the water vapor passageway 32 in such fashion that the filter element 37 divides the interior space of the passageway 32 into partitioned chambers in the longitudinal direction of the second heater 12. This allows the water vapor, while being heated, to pass through such plurality of filter elements 37.

By applying this filtration procedure, it is practically possible to get gases filtered therethrough free from any water particles of relatively large sizes, thus permitting water particle-free gases to be fed into the following stations. When water vapor is heated in the second heater 12, it expands further and becomes almost clear gases. Preferably, the filter element 37 is made of such material having a positive affinity with oxygen such as iron, and therefore, as thus obtained superheated water vapor passes through the filter elements 37, there occurs a catalytic reaction with oxygen on the surfaces of the elements. Therefore, oxygen contained in the superheated water vapor may partly be removed, consequently resulting in a refined state of gases which is optimalized for combustion reaction in the combustion chamber of the engine. It is also possible to make the filter elements 37 red-heated while water vapor is passing therethrough, thereby further promoting gasification of water vapor by contact therewith, thus enhancing the catalytic reaction in the second heater 12.

There are provided a plurality of communicating holes 38 directly in the cylinder head 17 of the engine, and these holes 38 are connected to the second heater 12 by means of tubes 39, whereby the gases heated and filtered through the second heater 12 are introduced into the cylinder head 17 of the engine.

It is known that the cylinder head portion of an engine is occasionally heated up to such a high temperature of 2,000° C or so by the heat generated in the combustion stroke of an internal combustion engine. The superheated water vapor introduced into the communicating holes 38 in the cylinder head 17 is now converted into water gases through instantly contacting with the high temperature metal walls of the cylinder head 17. There is provided a nozzle 40 at the outlet end of each communicating hole 38, the leading end of which nozzle 40 is further extended to and open in the suction tube 18 communicating with each combustion chamber 41 through the carburetor 19 of the engine. Thus obtained superheated water gases in the critical state as described hereinbefore is ejected into the suction tube 18 through the nozzle 40, wherein the water gases join mixed gases or mixture of vaporized fuel oil and hot air fed from the carburetor 19, thus obtaining mixed gases of three elements, i.e., water vapor, vaporized fuel oil and air, which are to be sucked or ejected into each of the combustion chambers 41.

There are also provided a plurality of communicating holes 42 for heating intake air in the cylinder head 17 of the engine. At one end of the hole 42, an intake pipe 43 is provided opening outwardly of the engine, and at the other end thereof it is connected with a heated air supplying tube 44 communicating with the carburetor 19. Air is introduced from outside through the intake pipe 43, heated to a desired temperature while passing through the communicating holes 42 in the cylinder head 17, and then directed to the carburetor 19 through the air supplying tube 44. A filter 45 for cleaning intake air is provided at the leading end of the intake pipe 43, whereby clean air free from any dust may, after being heated therein, be supplied to the carburetor 19.

Figure 5:
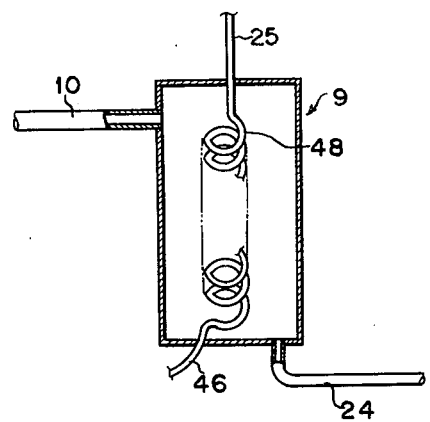
FIG. 5 is a schematic view, in vertical section, showing the construction of a fuel oil heater of the invention.
Figure 6:
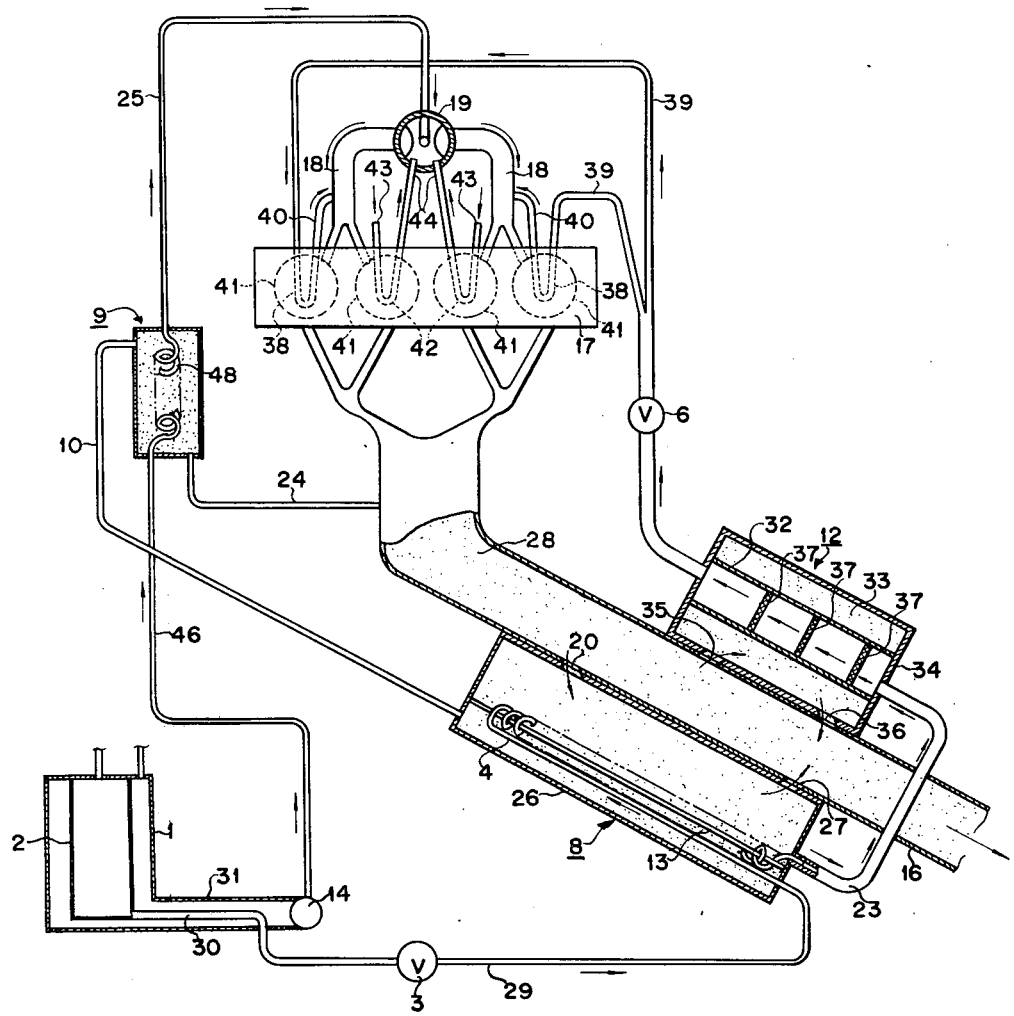
FIG. 6 is a general schematic view showing the mechanisms as shown in the preceding drawing figures in operative combination.
Figure 7:
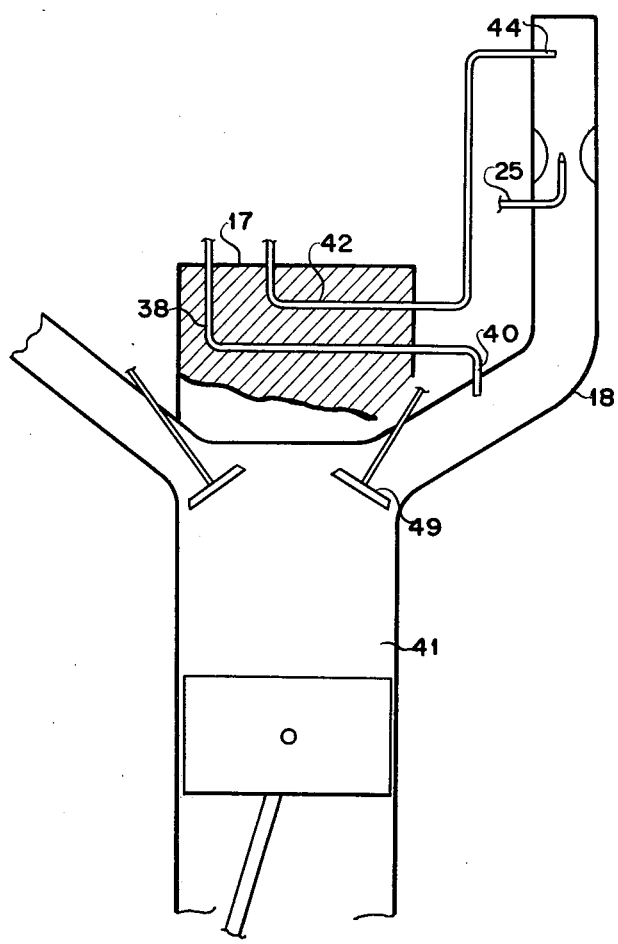
FIG. 7 is a cross-sectional elevational view showing in detail the construction of a carburetor and a combustion chamber of an engine.
Figure 8:
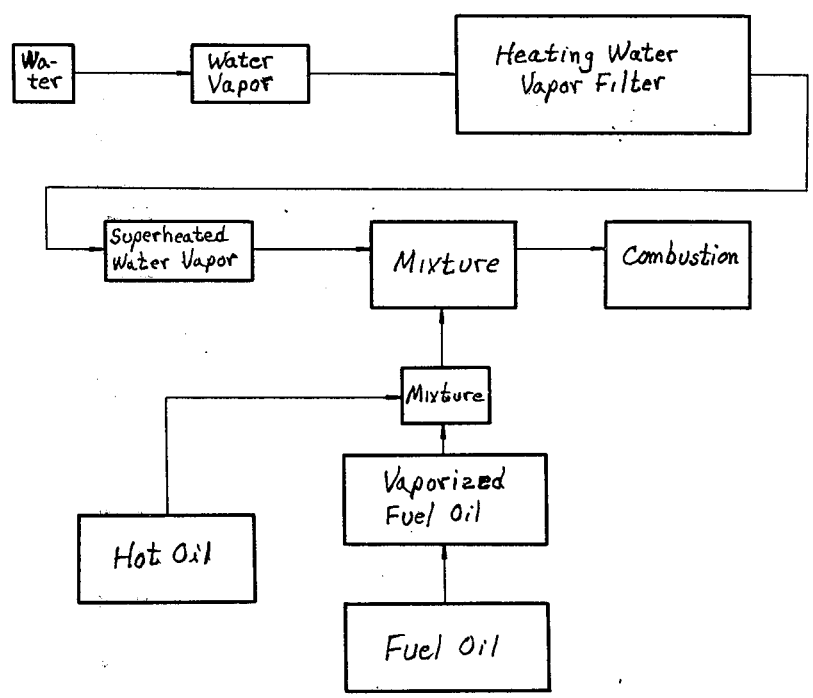
FIG. 8 is a block diagram indicating the operative systems in circuit according to the invention.

The fuel oil heater 9 illustrated in FIG. 5 is connected to the fuel tank 1 by way of the fuel supply tube 31 and a tube 46, whereby the fuel oil, which is delivered by function of the fuel pump 14, is arranged to be heated while passing through the fuel oil heater 9. This fuel oil heater 9 is of a hollow structure 47, wherein there is constantly fed exhaust gases by means of the tube 24 communicating with the first heater, respectively. In the fuel oil heater 9, there is provided a coiled tube 48, one end of which communicates with the tube 25, while the other end of which is connected with the vaporized fuel oil supplying tube 46. The outer surface of the coiled tube 48 is exposed to exhaust gases constantly fed within the hollow structure 47. Fuel oil supplied from the fuel tank 1 is therefore heated to gaseous phase while it circulates in the coiled tube 48 in the heater 9 and it absorbs the high temperature provided by the exhaust gases therewithin. This vaporized fuel oil is then directed to the carburetor 19 through the supplying tube 46, wherein the fuel oil in gaseous phase joins and is mixed with the above mentioned superheated water gases, and air. As described hereinbefore, the mixture of hot air and vaporized fuel oil and gasified water vapor is made to join together in the suction tube 18, thus forming mixed gases of three elements. Thus obtained mixed gases are fed into the combustion chamber 41 of the engine through a suction valve 49. Combustible elements such as water and fuel oil may be fully combusted under optimally superheated conditions. After a series of experiments repeated on an experimental automobile equipped with the internal combustion engine according to the present invention, it was found that unless gasoline and water are fed through separate channels until they reach the carburetor, there occurs no normal operation, which manner is particularly intended by the present invention. It was also found that the regulating valve 6 for regulating the water vapor feed should be arranged in synchronism with the function of the throttle valve for regulating the feed of vaporized fuel which is interlocked with the accelerator pedal of the engine. In other words, both the throttle valve and the regulating valve 6 should be under fully synchronized control in terms of valve opening rate. It is, however, more advantageous if there is additionally provided means permitting an increas in the mixing ratio of water vapor in a higher revolution range of the engine.

It was also found that if the ratio of unity of water is increased per more than unity of gasoline, i.e., if the ratio of admixing water is more than 50%, there is produced no sufficient output from the engine in a lower operating speed range. However, according to the present invention, it is now practically possible to increase the ratio of admixing water in the fuel, in view of the finding that there is obtained a sufficient output from the engine with the quantity of water more than that of gasoline only if there is assured a relatively high revolution of the engine.

The main cause of such dimishing in the engine output with a water admixing rate of more than 50% is attributable to the assumption that there would occur a reduction in hydrogen generation due to a sudden temperature drop caused by an increased water admixing rate. It is observed the phenomenon in which hydrogen is decomposed from water from a temperature of 1,000° C, and at 2,500° C there occurs this decomposition at a rate of 2 to 2.5%.

According to the present invention, there occurs a combustion of gasoline admixed with water vapor which is caused to be combusted with the superheated water gases in a critical state of cracking or nearly cracking. Consequently, with aid of hydrogen to be combusted together, it is practicably possible to obtain a far greater output from such combustion in the combustion chamber than the case of combustion of gasoline alone, as they may be fully combusted under optimally controlled combustion conditions. In addition, it is unusually possible to have a remarkably large quantity of water combusted with gasoline as a combustible element in a fuel.

In the internal combustion engine used in the series of experiments mentioned above, a fuel mixture was applied with a ratio of mixing; such as 2 liters of gasoline to 1 liter of water. It should be noted that there have not been any troubles in the engine's combustion system throughout the series of experiments for the past few years, and that the experimental automobile is still running trouble-free.

The above mentioned experimental automobile is of 1967's model of Nissan Sunny with the engine of 1,400 cc in total displacement equipped with the apparatus according to this invention. Although the experimental car is a used car with the total milage of 58,000 km, in a running test, according to the test data, the car could be operated free from any troubles at an average running speed of 60 km/h for the total net distance of 425.6 kms under normal running conditions on flat and smooth city roads, wherein the mixing ratio of water to gasoline was 3.855 liters to 13.3 liters. This test result shows a remarkable record such that 1 liter of gasoline can cover a running distance of 32 km. After a series of experiments, it was evidenced that the mixing ratio of water to gasoline could be increased up to as much as 70 to 100. This indicates that water is now a substantial part of the fuel in the internal combustion engine, which obviously evidences the proper utility of the present invention.

In addition to the remarkable test results in terms of fuel consumption, it was also evidenced by the whole experiment data that CO content in exhaust gases from the engine equipped with the apparatus of this invention could be held at a level of 0.4% or less in comparison with that of cars of the same conventional model. In consideration of the remarkably advantageous features of the present invention, it should be pointed out that the present invention may not only contribute remarkably to an elongation of the utility of the petroleum resources, but also may realize a "clean" engine meeting the requirements against environmental pollution which have turned out to be increasingly more severe in the past years.

Although the present invention has been described by reference to only a few embodiments thereof, it is to be understood that many changes and modifications may be readily derived by those skilled in the art, and it is intended by the appended claims to cover all such changes and modifications which will fall within the spirit and scope of the present invention.

What is claimed is:

1. In a method for combusting a fuel air mixture in a combustion chamber of an internal combustion engine, the improvement which comprises reducing the amount of fuel consumption necessary for running the internal combustion engine by admixing superheated water vapor which is free of water particles of relatively large sizes with the fuel and air mixture, said superheated water vapor being produced by first heating water in at least one stage at temperatures sufficient to convert it into water vapor and ultimately contacting this water vapor with the heated cylinder head of the internal combustion engine by means of communicating passageways provided in the walls of said heated cylinder head to convert the water vapor to superheated water vapor which is in the state of at least being partially cracked such that the water molecules are partially decomposed to hydrogen plus other gases, separately heating fuel and air at predetermined temperatures to produce vaporized fuel and hot air, mixing the separated heated superheated water vapor, hot air and vaporized fuel and combusting the gaseous mixture thus-formed in the combustion chamber under controlled combustion conditions.

2. The improvement according to claim 1, wherein the water, fuel and air are each separately heated by means of the hot exhaust gases from the engine to form the water vapor, vaporized fuel and hot air.

3. The improvement according to claim 1, wherein said superheated water vapor is mixed with said vaporized fuel oil and hot air prior to introduction into said combustion chamber, thereafter being fed as a mixture into said combustion chamber.

4. The improvement according to claim 1 wherein the water is first vaporized by means of the hot exhaust gases from the engine and then passed through a filtration step to remove water particles of a relatively large size and to partially remove oxygen therefrom; said filtration being effected by utilizing a catalytic reaction between oxygen in the water vapor and metal catalytic filter elements.

5. The improvement according to claim 4 wherein the filtration step is effected by passing the vaporized water into a heated chamber and through a series of porous metal gratings which have a strong affinity for oxygen.

6. The improvement according to claim 5 wherein the porous metal gratings are heated to a red hot stage by means of the exhaust gas from the internal combustion engine.

7. The improvement according to claim 1 wherein the mixing ratio of the fuel to the water vapor is 100 to 70.

8. The improvement according to claim 1 wherein the amount of water vapor to be mixed with the fuel is not more than 50%.

9. In an apparatus for obtaining a fuel mixture to be fed into a combustion chamber of an internal combustion engine, the improvement which comprises water supply means for connecting the water to heating devices, which heating devices are heated by means of the exhaust gases of the internal combustion engine at temperatures sufficient to convert the water to steam, one of said heating devices being such that it contains a plurality of porous metallic catalytic gratings in series having a strong affinity for oxygen by which the steam may be passed therethrough, said gratings being capable of being heated to a red hot state by the exhaust gases so that they serve as a filter to remove the larger droplets of water and part of the oxygen from the steam by a catalytic action, means for transporting the steam to the heated cylinder head of the internal combustion engine, whereby the steam enters the cylinder head by passageways in the walls of the cylinder head and is converted to superheated steam which is in the state of at least being partially cracked such that the water molecules are partially decomposed to hydrogen and other gases, means for heating fuel oil and air separately in a heating device utilizing the exhaust gas of the internal combustion engine as the heat source to produce vaporized fuel and hot air, means for admixing the superheated steam, vaporized fuel and hot air thus-separately heated and means for transferring the gaseous mixture into the internal combustion chamber.

10. The improvement according to claim 9 wherein the first heating device for converting the water to steam is composed of a hollow structure containing a heat accumulating rod in the center of said hollow structure and a coiled tube of high thermal conductivity encircling the length of the accumulating rod and adapted to pass water therewithin, said hollow structure containing openings whereby hot exhaust gases are permitted to enter and contact the tube, thereby converting the water therein to steam.

11. The improvement according to claim 9, wherein the water supply means is a water tank having a double wall construction in respect to a fuel tank and located within the fuel tank such that the water tank as well as the connecting means for transferring the water to the heating devices are surrounded by fuel to prevent the water from being frozen in cold weather.

12. The improvement according to claim 9 wherein the porous metallic catalytic gratings are made of iron.

* * * * *